Sept. 1, 1925.
W. A. GIBBONS ET AL
1,551,553
PROCESS FOR MANUFACTURING TUBING
Filed Oct. 6, 1924
3 Sheets-Sheet 1
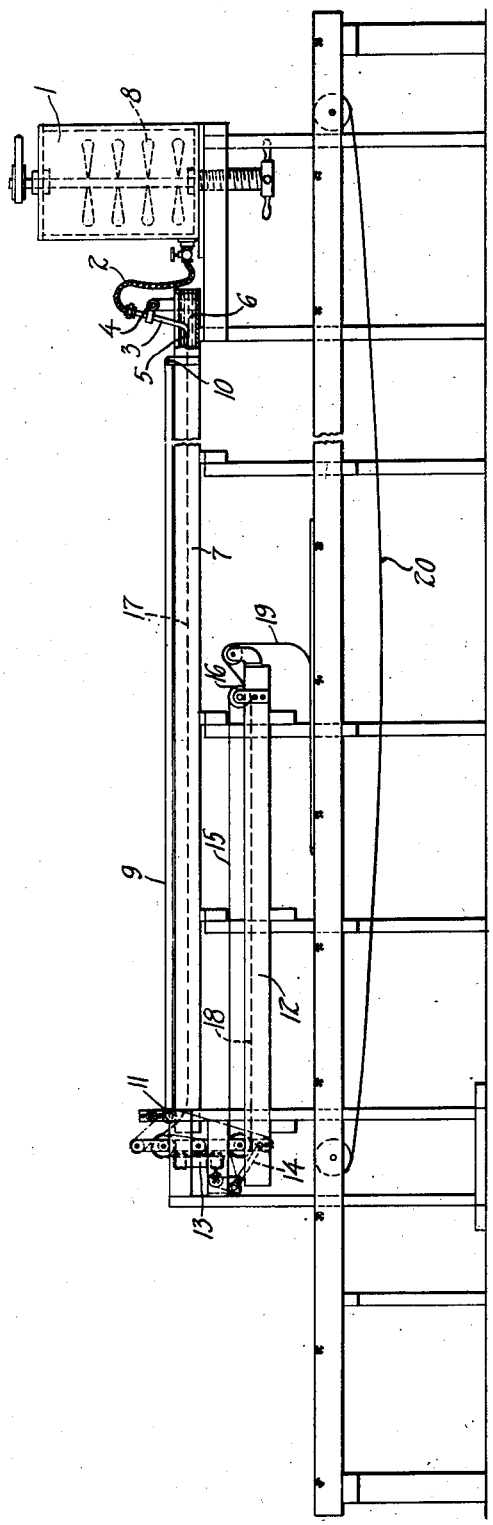
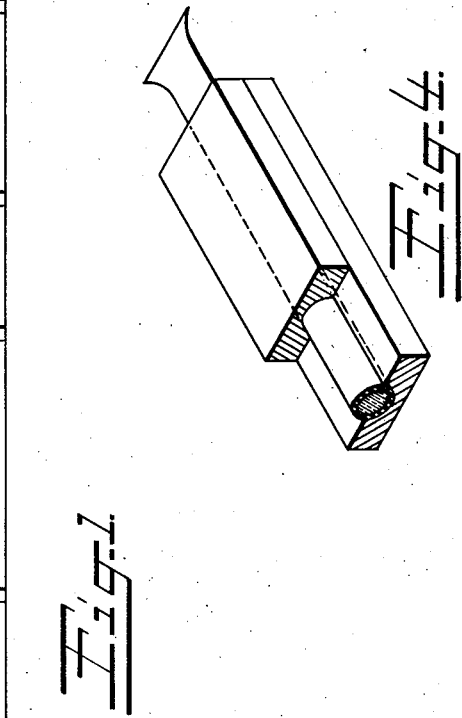
Inventors
WILLIS A. GIBBONS &
HEDWIG A. KOENIG
By their Attorney Sept. 1, 1925.
W. A. GIBBONS ET AL
1,551,553
PROCESS FOR MANUFACTURING TUBING
Filed Oct. 6, 1924 3 Sheets-Sheet 2
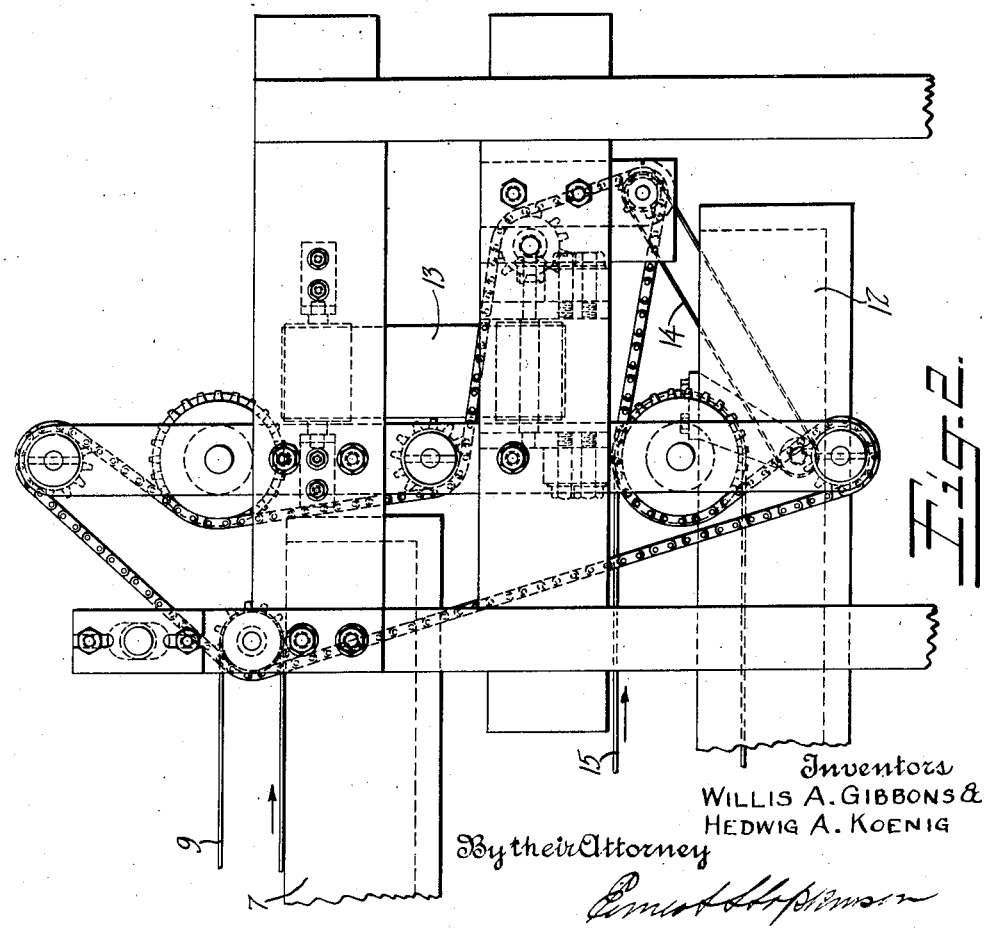
Inventors
WILLIS A. GIBBONS &
HEDWIG A. KOENIG
By their Attorney

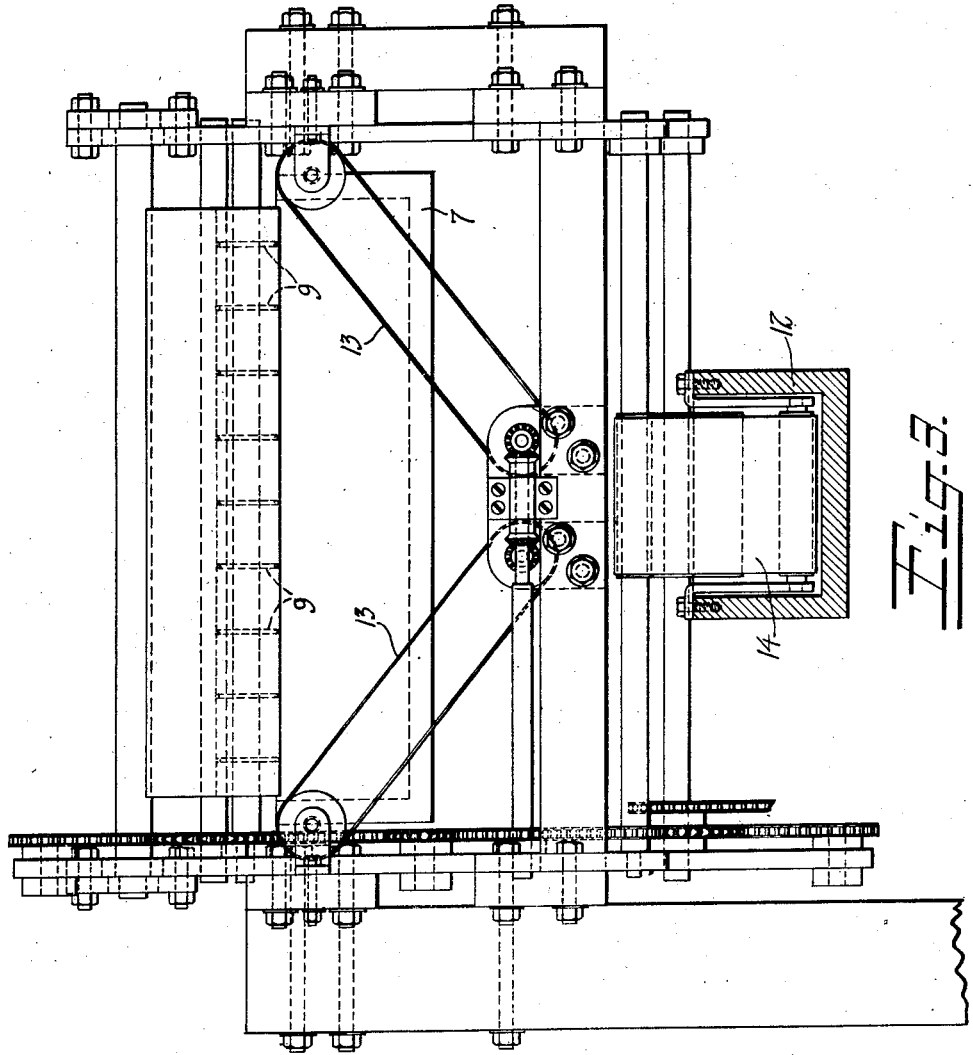

Patented Sept. 1, 1925.

1,551,553

UNITED STATES PATENT OFFICE.

WILLIS A. GIBBONS, OF LITTLE NECK, AND HEDWIG A. KOENIG, OF NEW YORK, N. Y., ASSIGNORS TO REVERE RUBBER COMPANY, OF CHELSEA, MASSACHUSETTS, A CORPORATION OF RHODE ISLAND.

PROCESS FOR MANUFACTURING TUBING.

Application filed October 6, 1924. Serial No. 741,832.

*To all whom it may concern:*

Be it known that we, WILLIS A. GIBBONS and HEDWIG A. KOENIG, both citizens of the United States, and residents of Little Neck, L. I., county of Nassau, and State of New York, and New York, county of New York, and State of New York, respectively, have invented new and useful Improvements in Process for Manufacturing Tubing, of which the following is a full, clear, and exact description of same.

This invention relates to a process and apparatus for manufacturing tubular articles.

Heretofore rubber tubing has been manufactured by calendering or otherwise sheeting rubber composition and longitudinally splicing the margins of strips thereof. Certain poor grades of tubing are made by extruding an inexpensive stiff rubber composition. Tubing heretofore made however has either not been any too satisfactory in quality or its manufacture has been overly difficult and impractical in a factory.

The present invention aims to improve upon the old practices, to simplify and expedite the manufacture of tubing, and to provide a superior product. Other objects and advantages will be apparent to one skilled in the art from the specification following.

With a preferred embodiment in mind and without intention to limit more than is required by the scope of the prior art, the invention, briefly stated, consists in continuously or intermittently streaming latex into a coagulant, partially coagulating the latex and forming a tube of freshly coagulated rubber containing a core of latex, washing off the coagulant if necessary or desired, and removing the liquid or latex core (preferably by confining the tubing externally and blowing or otherwise displacing the contained latex). If a vulcanized tube is desired, it may be obtained by either compounding the latex with suitable filling and/ or vulcanizing ingredients or by subjecting the tubing to vulcanizing solutions or vapors or to solutions containing vulcanizing ingredients with or without heating as required. Preferably rubber latex is employed because of its abundant supply at a reasonable cost, but obviously balata or gutta percha latices, might be employed alone or in admixture with rubber latex or each other, or an artificial latex (water dispersion of rubber, balata, or gutta percha) might be used. And generally it is to be understood the present invention in its broadest aspects comprehends the use of any dispersion of a substance coagulable into a tube within the principles underlying the process.

While any suitable apparatus may be employed to practice the invention, simple equipment for carrying on the process is shown more or less diagrammatically in the drawings in which, Figure 1 is a side elevation of an apparatus, Figure 2 is another elevation of one end of the apparatus from the opposite side;

Figure 3 is an end elevation of the same;

And Figure 4 is a perspective view partly in section of tubing confined externally incident to removal of latex from the center thereof.

According to the invention and assuming rubber tubing is to be manufactured from rubber latex, the latter, either in its natural strength or (and preferably) concentrated and usually containing a small percentage of a preservative such as ammonia is contained in a tank 1 or other source of supply suitably connected as by a flexible hose 2 to a nozzle 3 which preferably but not necessarily is adjustably mounted as indicated at 4 for locating the delivery orifice 5 at a desired elevation and angle relative to the surface of a coagulant 6 contained within a trough 7. Desirably an agitator 8 driven as desired is mounted within container 1 which is vertically adjustable to vary the hydraulic head on the liquid at the nozzle. By the means described rubber latex—containing for example from 55% to 65% of rubber—may be streamed into acetic acid or other coagulant and tubing formed continuously in any desired length. The stream of latex coagulates superficially the instant it enters the coagulant, and the coagulation of the rubber proceeds progressively from the outside inwardly during the time the stream of latex remains in the coagulating bath. The beginning end of the length of latex may be moved down the length of the bath 7 by the hydraulic head maintained in the container 1 but preferably is carried along mechanically at a uniform rate of speed. Desirably of course the thread or tube of latex or latex and rubber is maintained fairly straight or at least with no two parts of the tubing touching except possibly the ends, if curved tubing for instance is to be produced. In the drawings a form of an endless cord or belt 9 encircling pulleys 10 and 11 is shown for securing the ends of the streamed latex thereto and conducting the same through the coagulant. Any suitable number of these endless cords or belts 9 may be employed, nine being shown in Figure 3 of the drawings. Thus rubber latex may be continuously and progressively drawn from a container and formed into a tube consisting of a skin or sheathing of freshly coagulated rubber and a core of latex.

If the trough 7 is made long enough and the other factors in the process are properly adjusted, the stream of latex may be coagulated into tubing of the desired wall thickness while moving through the coagulant. In the apparatus illustrated, however, the trough 7 is not long enough to permit this being done and the incompletely coagulated tubing is pinched off and closed at the ends when it extends the length of the tank, the beginning end of the continuing stream of latex being guided to one side of the formed length which is allowed to remain in the coagulant and to be further coagulated by attaching the freshly coagulated end of the stream of latex to the next endless cord or belt. Thus lengths of freshly coagulated tubing containing latex may be laid in the trough 7 side by side and allowed to stand therein while coagulation continues inwardly to an extent forming a desired wall thickness. To trap latex within the partially formed tubing, the ends of the lengths thereof are pinched or otherwise closed. The length of time the streams of latex should remain in the coagulant will of course depend upon the external diameter and wall thickness of the tubing desired and upon the character and composition of the latex and also of the coagulant. Small tubing of outside diameter .33 in. wet (.29 in. dry) having wall thickness .042 in. wet (.038 dry) may be made from latex containing 58% solids in suspension streamed into the coagulant at a rate of 4.4 ft. a min. and removed after floating therein 15 mins., the coagulant being a mixture of acetic acid (60%) and denatured alcohol having specific gravity 1.03 at 15° C.

The lengths of tubing thus formed are then preferably but not necessarily conducted to a tank 12 containing water, or other liquid, being directed into the same, in the apparatus illustrated in the drawing, by transverse oppositely inclined conveyors 13 driven as convenient and located at the end of the coagulating trough 7 above one end of the washing trough 12. Optionally a short conveyor 14 may be employed to further conduct the lengths of tubing to the washing trough 12. Any suitable liquid may be employed to remove the coagulant from the outside of the lengths of tubing, such as water or a neutralizing solution, for instance dilute ammonia. To keep the lengths of tube submerged in the bath 12 a belt 15 guided by rollers 16 is preferably located as shown in the drawings, with its lower run or flight passing through the liquid. This of course presumes that the lengths of latex filled tube will float upon the washing liquid. If the contrary is the case and the latex is compounded in such a way as not to float in the washing liquid, then the lengths of tubing should of course be supported, the point being to conduct the lengths of tubing through the liquid in a manner substantially freeing them of acid.

The path of the incompletely coagulated latex is indicated in Figure 1 of the drawings by dash lines 17 and 18 and a solid line 19.

After washing, if resorted to, the residual uncoagulated latex at the center of the tubing is removed. While this may be done variously it is preferred to confine the lengths of tubing externally and displace the latex core with a fluid. In the drawings a sectional mold split longitudinally for convenience is shown, each half of the mold being provided with one or more cavities. A length of the tubing is laid in one of the cavities, which may be semi-circular, or of other desired form, and then the upper half of the mold is applied so as to completely confine the exterior of the tubes. When the mold is fully loaded it may be moved to one side, for instance by means of the conveyor belt indicated at 20. Or one or more tubes may be delivered simultaneously to the mold while the lower section thereof is advanced by the conveyor belt 20 so as properly to lay the length or lengths of tubing in the cavity or cavities therein.

The coagulated latex tubes thus confined externally and still closed at their ends— which project accessibly—are then freed of their latex core. This may be done in any manner convenient but preferably by slitting at one end and supplying fluid such as air or water under a moderate pressure to the other end. The greater part of the uncoagulated latex may be thus removed. Any uncoagulated latex remaining on the inner walls may be completely removed by passing a stream of water through the tube. Excess latex withdrawn from the tubing may of course be recovered and used again.

The tube thus prepared from latex with or without added ingredients may be used without further manufacturing operations for some purposes. But if a vulcanized tube is desired, vulcanization may be effected in various ways and as suited to the composition of the coagulated rubber. Where rubber latex with or without other ingredients (but not vulcanizing ingredients) is employed as the raw material, vulcanization may be effected by drying the finished tube and either subjecting it to an air cure or a vapor cure or by dipping it in a vulcanizing solution, for instance, one containing 5 parts by weight of zinc butylxanthogenate, 5 parts by weight of dibenzylamine, and 2 parts by weight of sulphur dissolved in 100 parts by weight of benzol containing 20-30% of carbon tetrachloride. Carbon tetrachloride increases the specific gravity of the benzol and decreases its inflammability. In place of the vulcanizing ingredients mentioned 3 parts by weight of nitrogen sulphide may be used alone dissolved in benzol 65 parts by weight and carbon tetrachloride 35 parts by weight. Or tetramethylthiuramdisulphide 1 part by weight, sulphur 3 parts by weight, zinc oxide 2 parts by weight, and diethylamine 2 parts by weight may be employed in benzol 100 parts by weight, or other solvent. Or 3 parts by weight of zinc dibenzyldithiocarbamate, and 1 part of sulphur by weight dissolved in 78 parts by weight carbon tetrachloride and 22 parts by weight benzol or other solvent may be used. After vulcanization in solutions it is desirable to dry the lengths of tubing.

Where vulcanizing ingredients are incorporated in the rubber latex with or without other compounding ingredients the vulcanization of the tubing may be effected in any manner convenient but preferably by submerging the tubing in water under requisite steam pressure to maintain the proper curing temperature either in the mold or stripped from the same. Of course the tubing in the mold may be vulcanized between steam heated platens of a press, or in talc if desired. An example of such a vulcanizable latex compound is 100 parts of rubber as latex, 3½ parts of sulphur, 1 part of zinc oxide, ½ part zinc dimethyldithiocarbamate. Another example of a vulcanizable compound is 100 parts of rubber as latex, 5 parts of clay, 5 parts of pure antimony sulphide, 3½ parts of sulphur, 1 part of zinc oxide, ½ part zinc dimethyldithiocarbamate. For manufacturing vulcanized tubing, it is preferred to employ compounded latex and to effect vulcanization by treatment in water under steam pressure.

Tubing made according to the present invention is seamless, and, possessing approximately the same strength lengthwise as transversely, is superior to the old tubes. The process of the present invention is practical for factory operation and affords a valuable advance in the manufacture of tubular types of rubber articles. While the invention has been described with smaller sizes of tubing in mind, it is obviously not limited in its application thereto and comprehends any and all sizes of tubes. Obviously the process permits the wall thickness to be varied without requiring changes in the apparatus and is therefore flexible. By varying the size of delivery end of the supply nozzle or by varying the elevation of the surface of the supply latex relative to the outlet of the nozzle, the external diameter of the tubing may be altered. The diameter of the tube may also be varied by increasing or decreasing the rate of withdrawal of the stream of latex from the supply nozzle. Other factors such as viscosity of the latex may be utilized to govern the size of the tube.

In the foregoing reference has only been made to the use of rubber latex. It is understood, however, that balata or gutta percha latices may be used either singly, or mixed with each other or rubber latex as practical. Instead of natural latex artificially prepared dispersions of rubber or other coagulable substances might be employed and all such capable of processing according to the principles of this invention are intended to be included as within the scope of the present invention.

Acetic acid has been mentioned as a coagulent but any other suitable coagulating agents may be employed. In this connection it is to be noted that it is desirable to have the coagulating bath of a specific gravity such that the latex projected into the same will float but will be largely submerged in the coagulant. Where uncompounded latex is employed as a raw material it may be desired to use a bath consisting of 100 parts of 85% acetic acid and 50 parts of 95% denatured alcohol in order to have a bath which while it is heavy enough to float the freshly coagulated latex allows it to remain almost entirely submerged at the top of the liquid. On the other hand where the latex is compounded and relatively heavy aqueous acetic acid may be used with no alcohol or it may be necessary to increase the gravity of the liquid still further by the addition of salts or other substances, as for example zinc acetate.

In the foregoing it has been endeavored to detail the invention sufficiently to guide one skilled in the art in the practice thereof. It is not intended, however, to limit the scope of the invention to the specific data, materials, and steps, outlined excepting as pointed out hereinafter in the claims, it being obvious that the principles underlying the invention are susceptible of embodiment in other latex compounds and procedures. In the claims the term latex is employed in a broad sense to comprehend any strength and/or composition of aqueous dispersion of rubber or the like coagulable by agents such as or equivalent to those hereinbefore mentioned.

Having thus described our invention, what we claim and desire to protect by Letters Patent is:

1. A process of manufacturing tubing which consists in streaming a dispersion of rubber into a coagulant, coagulating the same to form a tubing with a core of the dispersion, and withdrawing the core from the tubing.

2. A process of manufacturing tubing which consists in streaming an aqueous dispersion of rubber into a coagulant, coagulating the same to form a tubing with a core of the aqueous dispersion, and withdrawing the core from the tubing.

3. A process of manufacturing tubing which consists in streaming latex into a coagulant and removing it therefrom in an incompletely coagulated condition, and removing the uncoagulated latex and forming a tube.

4. A process of manufacturing tubing which consists in forming a length of latex, coagulating said length of latex from its outside inwardly and producing a tube containing latex in its bore, and removing the residual latex from within said tube.

5. A process of manufacturing tubing which consists in streaming latex into a coagulant, closing off the ends of lengths of the tubing to trap latex therein, further coagulating said lengths and forming tubing, and removing the latex core therefrom.

6. A process of manufacturing tubing which consists in streaming latex into a coagulant, incompletely coagulating the latex and forming tubing with a core of latex, removing the residual latex core, and finishing the tubing.

7. A process of manufacturing tubing which consists in streaming latex into a coagulant and forming a tube containing latex, displacing the contained latex from the tubing with a different fluid to form a tube, and finishing the tube.

8. A process of manufacturing tubing which consists in streaming latex into a coagulant and forming tubing with a latex core, washing the tubing externally to free it from the coagulant, and removing the latex core to form tubing.

9. A process of manufacturing tubing which consists in streaming latex into a coagulant and forming tubing containing a latex core, closing the tubing at intervals and severing it to form lengths thereof, removing the lengths from the coagulant, confining the lengths externally, and removing the latex core with fluid under pressure while the lengths of tubing are confined.

10. A process of manufacturing tubing which consists in streaming latex into a coagulant the specific gravity of which is not less than that of the latex, coagulating the stream of latex to form tubing containing a center of latex, subsequently removing the latex core.

11. A process of manufacturing tubing which consists in streaming a dispersion of rubber into a coagulant, coagulating the same to form a tubing with a core of the dispersion, withdrawing the core from the tubing, and vulcanizing.

12. A process of manufacturing tubing which consists in streaming an aqueous dispersion of rubber into a coagulant, coagulating the same to form a tubing with a core of the aqueous dispersion, withdrawing the liquid core from the tubing, and vulcanizing.

13. A process of manufacturing tubing which consists in streaming latex into a coagulant, coagulating the stream of latex from its exterior towards its interior to form a tubing of desired wall thickness with a latex core, removing the latex core, and vulcanizing the tubing.

14. A process of manufacturing tubing which consists in streaming latex into a coagulant, coagulating the streamed latex therein from its outside inwardly to form tubing with a latex core, confining the tubing externally and removing the uncoagulated latex at the center of the tubing, and subjecting the tubing thus formed to vulcanizing treatment.

Signed at New York, county of New York, and State of New York, this 1st day of October 1924.

WILLIS A. GIBBONS.
HEDWIG A. KOENIG.